United States Patent [19]

Ito

[11] Patent Number: 5,350,216

[45] Date of Patent: Sep. 27, 1994

[54] RECLINING SEAT APPARATUS

[75] Inventor: Sadao Ito, Anjo, Japan

[73] Assignee: Aisin Seiki Kabushiki Kaisha, Kariya, Japan

[21] Appl. No.: 909,394

[22] Filed: Jul. 8, 1992

[30] Foreign Application Priority Data

Jul. 9, 1991 [JP] Japan .................................. 3-168341

[51] Int. Cl.⁵ .............................................. B60N 1/06
[52] U.S. Cl. .................................. 297/362; 297/362.11
[58] Field of Search ............... 297/362, 361, 376, 355, 297/362.11, 361.1, 354.12, 354.1

[56] References Cited

U.S. PATENT DOCUMENTS

| 3,667,804 | 6/1972 | Hideaki | 297/362 |
| 4,020,717 | 5/1977 | Johnson | 297/362 |
| 4,573,738 | 3/1986 | Heesch | 297/362 |
| 4,668,013 | 5/1987 | Wahlmann | 297/362 |
| 4,708,392 | 11/1987 | Werner | 297/361 |
| 4,795,212 | 1/1989 | Bailey | 297/361 |
| 5,005,907 | 4/1991 | Caillol | 297/362 |
| 5,090,771 | 2/1992 | Kawakita | 297/362 |

FOREIGN PATENT DOCUMENTS

| 0924365 | 7/1949 | Fed. Rep. of Germany | 297/362 |
| 2808954 | 9/1979 | Fed. Rep. of Germany | 297/361 |
| 2834707 | 12/1979 | Fed. Rep. of Germany | 297/362 |

OTHER PUBLICATIONS

"Diamante" published by Mitsubishi Motor Company, Ltd., No. 1037030, May, 1990 (7 pages).

Primary Examiner—P. Austin Bradley
Assistant Examiner—James Miner
Attorney, Agent, or Firm—Finnegan, Henderson, Farabow, Garrett & Dunner

[57] ABSTRACT

A reclining seat apparatus which is installed in a vehicle body comprises a seat cushion having a pair of side portions at its rearward position and mounted on a floor of the vehicle body, a pair of lower arms secured to the pair of side portions, respectively, a pair of outward gears provided to the pair of lower arms, respectively, a seat back having a pair of side portions at its lower position which is to be located on or above the rearward position of the seat cushion, a pair of upper arms secured to the pair of side portions of the seat back, a pair of inward gears provided to the pair of upper arms, respectively, in such a manner that each of the pair of outward gears is in meshing engagement with respective inward gear and the number of teeth of each outward gear is less than that of the inward gear by one, a pair of shafts each of which has a circular portion on which respective lower arm is rotatably mounted and an eccentric portion on which respective upper arm is secured, a motor set to rotate one of the pair of shafts in order that the resulting rotation may establish a reclining movement of the seat back through an angle relative to the seat cushion, and a stopper mechanism, for regulating the reclining movement of the seat back, provided between the motor and the shaft.

7 Claims, 4 Drawing Sheets

RECLINING SEAT APPARATUS

BACKGROUND OF THE INVENTION

The present invention relates to a reclining seat apparatus, and in particular to a reclining seat apparatus in which the reclining angle is set to be adjusted by a motor.

In general, a reclining seat apparatus has a seat cushion which is provided at its rearward side portions with a pair of lower arms respectively, and a seat back which is provided at its lower end portions with a pair of upper arms respectively which are corresponding to the pair of lower arms. Each lower arm is provided therein with an inward gear which is in mesh engagement with an outward gear of each upper arm which is eccentrically arranged to the inner gear. Due to the difference between the outward gear and the inward gear in number of teeth, when the outward gear is rotated by a motor, the lower arms are rotated, which results in that an angle defined between the seat cushion and the seat back is adjusted according to the rotation thereof. When the seat back reaches its frontmost position (rearmost position), the rotating lower arm is set to turn on a first limit switch (a second limit switch), thereby turning off the motor. The foregoing structure is disclosed in the shop manual for "DIAMANTE" published by Mitsubishi Motor Co., Ltd. in May, 1990.

However, in the foregoing structure, if one of the limit switches malfunctions due to an unexpected accident or other reason, the relatively large torque is being applied to the outward gear continually until the motor is turned off manually. In light of the fact that such torque application will cause the separation of the inward gear from the outward gear, both of the upper arms and the lower arms need to be reinforced if the prevention of such separation is desired. Such requirement is contrary to recent requirements for lighter weight automotive vehicle parts.

SUMMARY OF THE INVENTION

It is, therefore, a primary object of the present invention to provide a reclining seat apparatus without the foregoing drawback.

It is another object of the present invention to provide a reclining seat apparatus wherein no reinforcements are required to lower arms and upper arms.

In order to attain the foregoing objects, a reclining seat apparatus which is installed in a vehicle body comprises a seat cushion having a pair of side portions at its rearward position and mounted on a floor of the vehicle body, a pair of lower arms secured to the pair of side portions, respectively, a pair of outward gears provided to the pair of lower arms, respectively, a seat back having a pair of side portions at its lower position which is to be located on or above the rearward position of the seat cushion, a pair of upper arms secured to the pair of side portions of the seat back, a pair of inward gears provided to the pair of upper arms, respectively, in such a manner that each of the pair of outward gears is in meshing engagement with respective inward gears and the number of teeth of each outward gear is less than that of the inward gear by at least one, a pair of shafts each of which has a circular portion on which respective lower arm is rotatably mounted and an eccentric portion on which respective upper arm is secured, a motor set to rotate one of the pair of shafts in order that the resulting rotation may establish a reclining movement of the seat back through an angle relative to the seat cushion, and a stopper mechanism, for regulating the reclining movement of the seat back, provided between the motor and the shaft.

BRIEF DESCRIPTION OF THE DRAWINGS

The above and other objects, features and advantages of the present invention will be more apparent and more readily appreciated from the following detailed description of preferred embodiments of the present invention, taken in connection with the accompanying drawings, in which.

DESCRIPTION OF THE PREFERRED EMBODIMENTS

Embodiments of the present invention will be described hereinunder in detail with reference to the accompanying drawings.

Figure 1:
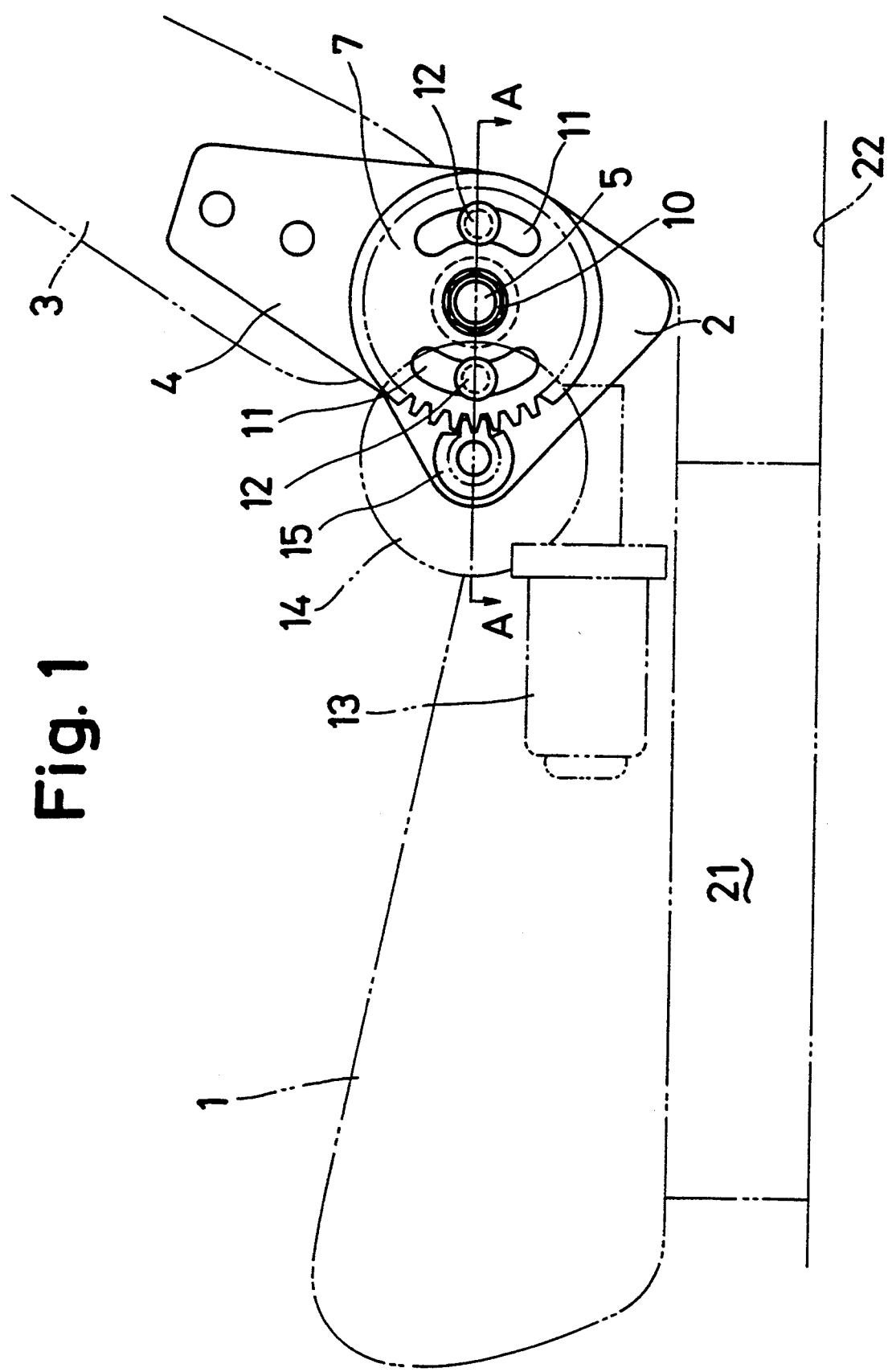
FIG. 1 is a side view of a seat including one embodiment of a reclining device according to the present invention.

Referring to FIG. 1, a pair of lower arms 2 (only one is shown) is secured to rear side portions (only one is shown) of a seat cushion 1 which is, as well-known, slidably mounted via a rail means 21 on a floor 22 of a vehicle (not shown). A seat back 3 is secured at its lower side portions with a pair of upper arms 4 (only one is shown). The upper arm 4 is rotatably connected to the respective lower arm 2 via an eccentric shaft 5 which will be detailed later, which results in that the seat back 3 is able to make a reclining angle relative to the seat cushion 1.

Figure 2:
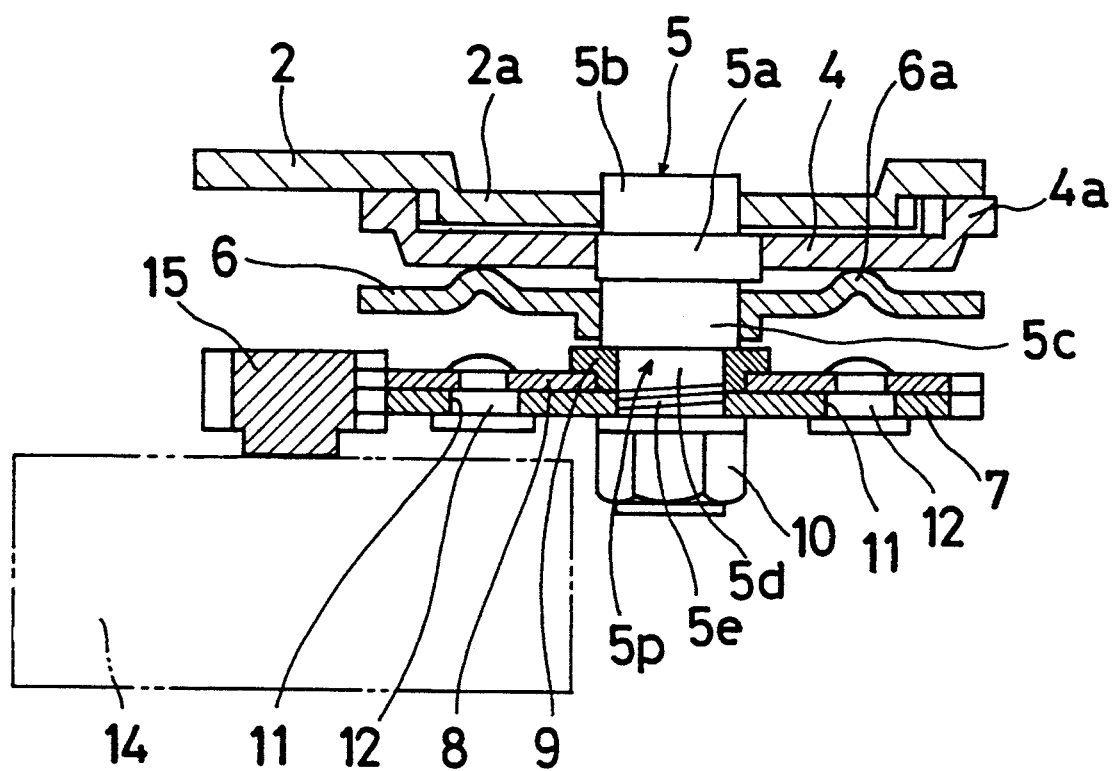
FIG. 2 is a cross-sectional view taken along line A—A in FIG. 1.
Figure 3:
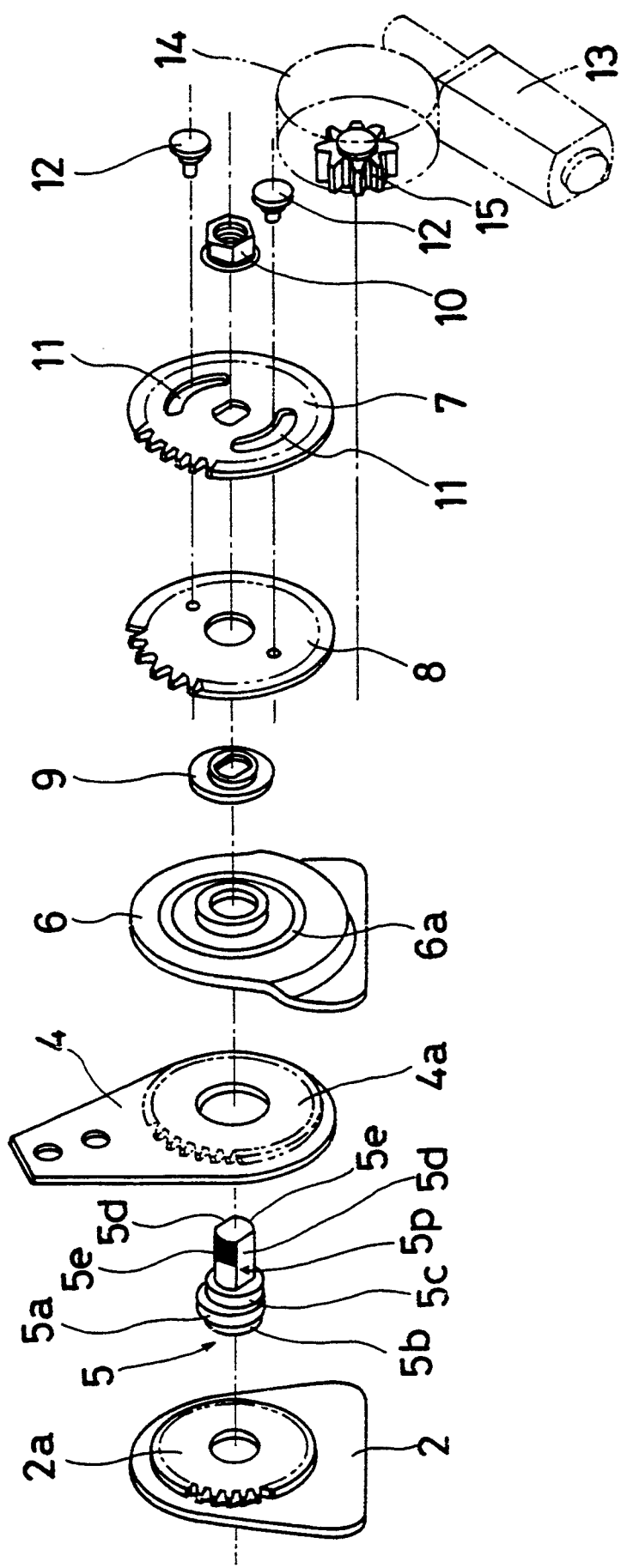
FIG. 3 is an exploded view of a seat shown in FIG. 1.

As best shown in FIGS. 2 and 3, the eccentric shaft 5 has a first circular portion 5b, an eccentric portion 5a relative thereto, a second circular portion 5c which is co-axial with the first circular portion 5b, and a projection 5p including a pair of opposed flat portions 5d and a pair of opposed curved portions 5e each of which is located between opposed flat portions 5d. Each of the opposed curved portions 5e is formed at its distal end with a threaded configuration. The shaft 5 is rotatably mounted at its first circular portion 5b to the lower arm 2, and is at its eccentric portion 5a set to support the upper arm 4 for eccentric motion of inward gear 4a relative to shaft 5. The upper arm 4 is formed with an inward gear 4a which is co-axial with the eccentric portion 5a. The lower arm 2 is formed with an outward gear 2a which is co-axial with the first circular portion 5b in such a manner that the number of teeth of the outward gear 2a is less than that of the inward gear 4a by at least one. The second circular portion 5c of the shaft 5 is set to mount or support a supporting plate 6 which is secured to the lower arm 2. The upper arm 4 is set to be interposed or disposed between the lower arm 2 and the supporting plate 6 in such a manner that the inward gear 4a is in mesh engagement with the outward gear 2a. It is to be noted that the supporting plate 6 is provided with an annular projection 6a which is set to so as to surround the eccentric shaft 5 in order to regulate the axial movement of the upper arm 4 by the establishment of an engagement thereof with the annular projection 6a of the supporting plate 6.

A bushing 9 is mounted on the projection 5p of the shaft 5 so as not to be rotated relative thereto, and a first gear 7 is rotatably mounted on the projection 5p so as to be adjacent to the bushing 9. On the bushing 9, there is mounted a second gear 8 in order to be freely rotated. The first gear 7 is identical to the second gear 8 in rating except for the number of teeth. A nut 10 is in the screw engagement with the threaded portions 5e of the projection 5p so as to prevent the extraction of each elements from the eccentric shaft 5 which is mounted thereon. A pair of equally spaced arc-shaped slots 11 are formed in the first gear 7 each of which is co-axial with the shaft 5, and a pair of pins 12 are driven in the second gear 8 which are passed slidably through the pair of slots 11, respectively. A motor 13, which is secured to the lower arm 2, is connected via a reducing mechanism 14 to a pinion gear 15 which is in mesh engagement with the first gear 7 and the second gear 8. The pinion gear 15 is identical to the first gear 7 and the second gear 8 in rating except for the number of teeth. For enabling the easy establishment of the foregoing engagement, at least one of the first gear 7 and the second gear 8 is set to be in the form of a profile shifted gear or a so-called x-gear.

In operation, when the motor 13 is turned on, the resultant rotation thereof is transmitted via the reducing mechanism 14 to the pinion gear 15. The rotation of the pinion gear 15 is then transmitted via the first gear 7 to the eccentric shaft 5, which results in its rotation. Concurrently, the rotation of the pinion gear 15 is also transmitted to the second gear 8, which results in that its rotation relative to the first gear 7, and sliding movement of each of the pins 12 along the corresponding slot 11 due to the difference between the first gear 7 and the second gear 8 in the number of teeth. The resultant rotation of the shaft 5 brings the rotation of the upper arm toward the lower arm 2 through an angle which depends on the difference in the number of teeth between the inward gear 4a and the outward gear 2a. Thus, a reclining movement of the seat back 3 relative to the seat cushion 1 is established. If the motor 13 is continued to be turned on for further adjustment of the reclining angle of the seat back 3 relative to the seat cushion 1, the pin 12 is ultimately brought into engagement of an end wall of the slot 11. Then, the rotation of the shaft 5 (the first gear 7) is forced to stop. At this time, the motor 13 is turned off by the operator. However, even if the turning-off of the motor 13 is not performed by the operator, the engagement between the first gear 7 and the second gear 8 prevents the rotation torque which is relatively large from transmitting to the lower arm 2, which results in the engagement between the outward gear 2a of the lower arm 2 and the outward gear 4a of the upper arm 4 and therefore no reinforcements are required to the lower arm 2 and the upper arm 4.

It is to be noted that a control system can be employed in which the current supply to the motor 13 is interrupted automatically upon an activation of sensor means which is set to detect the engagement of the pin 12 with the end wall of the slot 11 or the overload of the motor 13 due to the termination of the rotation of the shaft 5. In such case, the foregoing concept wherein the engagement of the first gear 7 and the second gear 8 is set to prevent the transmission of the relatively large rotation torque from the motor 13 to the lower arm 2 can be in practical use when the sensor means is in malfunction due to an unexpected accident.

Figure 4:
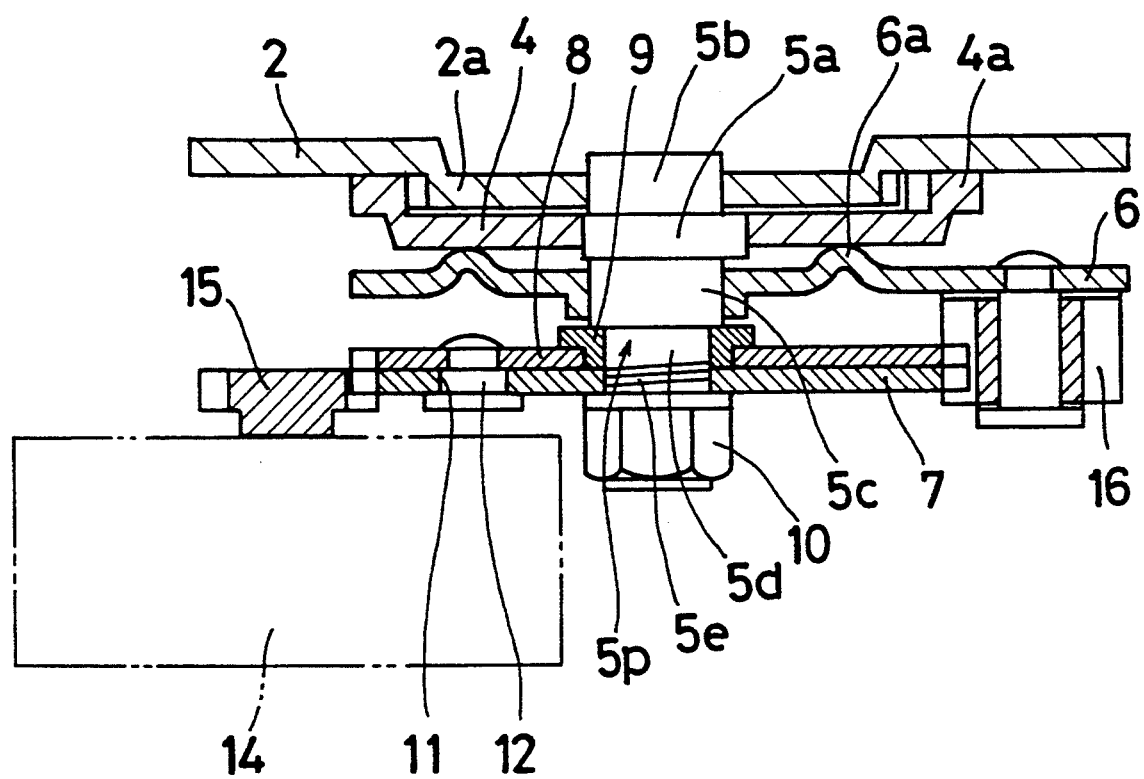
FIG. 4 is a view of another embodiment of a reclining device according to the present invention.

In FIG. 4, there is illustrated another stopper mechanism in cross-section. In this embodiment, the pinion gear 15 is in meshing engagement only with the first gear 7, and the first gear 7 and the second gear 8 are in meshing engagement with a common idle gear 16 which is rotatably mounted to the supporting plate 6. It is to be noted that the number of teeth of the first gear 7 can be identical to that of the second gear 8.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A reclining seat apparatus for a vehicle comprising:
a seat cushion mountable on a floor of a vehicle body;
a pair of lower arms, each of which is secured to a pair of rear side portions of the seat cushion;
a pair of upper arms, each of which is swingably secured to a corresponding one of the lower arms through a pair of shafts, each of the shafts having an eccentric portion on which one of the corresponding upper arms and the corresponding lower arm is supported;
a seat back secured to the upper arms at a pair of lower side portions thereof;
a pair of inward gears, each of which is disposed on one of the corresponding upper arms and the corresponding lower arm;
a pair of outward gears, each of which is disposed on the other one of the corresponding upper arms and the corresponding lower arm so as to be engaged with the corresponding inward gear at a part of the circumference thereof, a number of teeth of each of the outward gears being less than that of each of the inward gears;
stopper means having a first gear secured on the shaft, a second gear having a differing number of teeth from the first gear and mounted on the shaft so as to be rotatable relative to the first gear through an angle, and restriction means for establishing a first engagement between the first gear and the second gear when the first gear reaches a first angular limit in one direction and a second engagement between the first gear and the second gear when the first gear reaches a second angular limit in the other direction; and
driving means for rotating at least one of the first gear and the second gear.

2. A reclining seat apparatus in accordance with claim 1, wherein the stopper means further includes a pinion gear driven by the driving means and meshed with both of the first gear and the second gear.

3. A reclining seat apparatus in accordance with claim 1, wherein the stopper means further includes a first pinion gear driven by the driving means and meshed with the first gear, a second pinion meshed with both of the first gear and the second gear, and a supporting plate connected on the shaft and rotatably supporting the second pinion.

4. A reclining seat apparatus in accordance with claim 1, wherein the restriction means has a pin which is driven in the second gear, and an arc-shaped groove formed in the first gear so as to receive the pin slidable with respect to the groove.

5. A reclining seat apparatus in accordance with claim 1, wherein at least one of the first gear and the second gear is in the form of a profile shifted gear.

6. A reclining seat apparatus for a vehicle body comprising:

a seat cushion having a pair of rear side portions and mountable on a floor of the vehicle body;

a lower arm secured to one of the rear side portions of the seat cushion;

an outward gear secured to the lower arm;

a seat back having a pair of lower side portions and located on or above a rearward portion of the seat cushion;

an upper arm secured to one of the lower side portions of the seat back;

an inward gear secured are the upper arm, in such a manner that the outward gear is in meshing engagement with the inward gear and a number of teeth of the outward gear is at least one less than a number of teeth of the inward gear;

a shaft having a circular portion on which the lower arm is rotatably mounted and an eccentric portion on which the upper arm is supported;

a motor energizeable to rotate the shaft in order that the resulting rotation may establish a reclining movement of the seat back through an angle relative to the seat cushion; and stopper means for regulating the reclining movement of the seat back, having a first gear secured on the shaft, a second gear differing from the first gear in a number of teeth and mounted on the shaft so as to be rotatable relative to the first gear through an angle, restriction means for establishing a first engagement between the first gear and the second gear when the first gear reaches a first angular limit in one direction and a second engagement between the first gear and the second gear when the first gear reaches a second angular limit in the other direction, and a pinion gear driven by the motor and meshed with both of the first gear and the second gear.

7. A reclining seat apparatus for a vehicle body comprising:

a seat cushion having a pair of rear side portions and mountable on a floor of the vehicle body;

a lower arm secured to one of the side portions of the seat cushion;

an outward gear secured to the lower arms;

a seat back having a pair of lower side portions and located on or above a rearward portion of the seat cushion;

an upper arm secured to one of the pair of lower side portions of the seat back;

an inward gear secured to the upper arm, in such a manner that the outward gear is in meshing engagement with the inward gear and a number of teeth of the outward gear is at least one less than a number of teeth of the inward gear;

a shaft having a circular portion on which the lower arm is rotatably mounted and an eccentric portion on which the upper arm is supported;

a motor energizeable to rotate the shaft in order that the resulting rotation may establish a reclining movement of the seat back through an angle relative to the seat cushion; and stopper means for regulating the reclining movement of the seat back, having a first gear secured on the shaft, a second gear differing from the first gear in a number of teeth and mounted on the shaft so as to be rotatable relative to the first gear through an angle, restriction means for establishing a first engagement between the first gear and the second gear when the first gear reaches a first angular limit in one direction and a second engagement between the first gear and the second gear when the first gear reaches a second angular limit in the other direction, a first pinion gear driven by the motor and meshed with the first gear, a second pinion meshed with both of the first gear and the second gear, and a supporting plate connected on the shaft and rotatably supporting the second pinion.

* * * * *

UNITED STATES PATENT AND TRADEMARK OFFICE
CERTIFICATE OF CORRECTION

PATENT NO. : 5,350,216
DATED : September 27, 1994
INVENTOR(S) : Ito

It is certified that error appears in the above-identified patent and that said Letters Patent is hereby corrected as shown below:

Claim 6, Col. 5, line 19, change "are" to --to--.

Claim 7, Col. 6, line 9, change "arms" to --arm--.

Signed and Sealed this

Twenty-second Day of November, 1994

Attest:

BRUCE LEHMAN

*Attesting Officer*    Commissioner of Patents and Trademarks